United States Patent
Takabayashi et al.

(10) Patent No.: US 10,243,483 B2
(45) Date of Patent: Mar. 26, 2019

(54) POWER CONVERSION DEVICE

(71) Applicant: MITSUBISHI ELECTRIC CORPORATION, Chiyoda-ku, Tokyo (JP)

(72) Inventors: Hirokazu Takabayashi, Tokyo (JP); Yukio Nakashima, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/519,331

(22) PCT Filed: Oct. 22, 2014

(86) PCT No.: PCT/JP2014/078133
§ 371 (c)(1),
(2) Date: Apr. 14, 2017

(87) PCT Pub. No.: WO2016/063386
PCT Pub. Date: Apr. 28, 2016

(65) Prior Publication Data
US 2017/0237360 A1 Aug. 17, 2017

(51) Int. Cl.
*H02M 7/537* (2006.01)
*H02M 7/00* (2006.01)
*H02M 1/084* (2006.01)

(52) U.S. Cl.
CPC .......... *H02M 7/537* (2013.01); *H02M 1/084* (2013.01); *H02M 7/003* (2013.01)

(58) Field of Classification Search
CPC ............................ H02M 7/537; H02M 7/003
See application file for complete search history.

(56) References Cited

U.S. PATENT DOCUMENTS 5,631,821 A   5/1997   Muso
6,064,578 A *   5/2000   Hashimoto ........... H02M 7/003
                                          363/16

(Continued)

FOREIGN PATENT DOCUMENTS

CN     1679221 A     10/2005
JP     07-194139 A     7/1995

(Continued)

OTHER PUBLICATIONS

English translation of JP 11-136960 and Jp 2006-197735.*

(Continued)

*Primary Examiner* — Timothy J Dole
*Assistant Examiner* — Sisay G Tiku
(74) *Attorney, Agent, or Firm* — Buchanan Ingersoll & Rooney PC

(57) ABSTRACT

A power conversion device includes a filter capacitor to accumulate therein DC power, and an element unit including a semiconductor element module to perform a switching operation for converting the DC power accumulated in the filter capacitor into AC power. The filter capacitor and the element unit are disposed in the same casing. A heat-resistant capacitor having a higher heat resistance than the filter capacitor is connected to the element portion by using a connection conductor, and is also connected to a busbar different from the connection conductor. An electrical connection between the filter capacitor and the element unit is established through the busbar, the connection conductor, and the heat-resistant capacitor.

11 Claims, 4 Drawing Sheets

(56) References Cited

U.S. PATENT DOCUMENTS

| | | | |
|---|---|---|---|
| 2005/0270715 A1 | 12/2005 | Yamamoto et al. | |
| 2011/0051371 A1* | 3/2011 | Azuma | B60K 6/445 361/699 |
| 2013/0322141 A1* | 12/2013 | Kobayashi | H02M 7/003 363/123 |
| 2014/0111003 A1* | 4/2014 | Imai | H02M 7/003 307/10.1 |
| 2017/0040906 A1* | 2/2017 | Hattori | H02M 7/48 |
| 2017/0194872 A1* | 7/2017 | Fukumasu | H02M 7/003 |

FOREIGN PATENT DOCUMENTS

| | | | |
|---|---|---|---|
| JP | 11-127583 A | | 5/1999 |
| JP | 11-136960 A | | 5/1999 |
| JP | 11-136960 A | * | 5/1999 |
| JP | 11-220869 A | | 8/1999 |
| JP | 2000-152662 A | | 5/2000 |
| JP | 2001-352767 A | | 12/2001 |
| JP | 2002-290088 A | | 10/2002 |
| JP | 2004-096974 A | | 3/2004 |
| JP | 2006-197735 A | | 7/2006 |
| JP | 2006-197735 A | * | 7/2006 |
| JP | 2006-269652 A | | 10/2006 |
| JP | 2006-319300 A | | 11/2006 |
| JP | 2007-215396 A | | 8/2007 |
| JP | 2009-201214 A | | 9/2009 |
| JP | 2009-291055 A | | 12/2009 |
| JP | 2011-096916 A | | 5/2011 |
| JP | 2011-239679 A | | 11/2011 |
| JP | 2012-210153 A | | 10/2012 |
| JP | 2013-252006 A | | 12/2013 |

OTHER PUBLICATIONS

International Search Report (PCT/ISA/210) dated Jan. 20, 2015, by the Japanese Patent Office as the International Searching Authority for International Application No. PCT/JP2014/078133.

Written Opinion (PCT/ISA/237) dated Jan. 20, 2015, by the Japanese Patent Office as the International Searching Authority for International Application No. PCT/JP2014/078133.

Notification of Reason for Refusal dated Jan. 31, 2017, by the Japanese Patent Office for Application No. 2016-555010.

Office Action dated Sep. 5, 2018, by the Chinese Patent Office in corresponding Chinese Patent Application No. 201480082666.4 and English translation of the Office Action. (14 pages).

* cited by examiner

POWER CONVERSION DEVICE

FIELD

The present invention relates to a power conversion device.

BACKGROUND

In a conventional power conversion device, a wide connection conductor is used to electrically connect a capacitor terminal portion and an IGBT-element terminal portion, in order to obtain a low-inductance structure (see Patent Literature 1, for example).

CITATION LIST

Patent Literature

Patent Literature 1: Japanese Patent Application Laid-open No. 2011-239679

SUMMARY

Technical Problem

For the above conventional power conversion device employing a switching element having a higher allowable temperature, such as a switching element made of silicon carbide (SiC) (hereinafter, "SiC element"), unfortunately, a higher temperature is transmitted to the capacitor through the connection conductor. Thus, the conventional power conversion device needs to use a capacitor having a heat resistance (hereinafter, "heat-resistant capacitor"). This results in the problem of the cost increase.

To avoid the cost increase, the power conversion device can be configured without using the heat-resistant capacitor. In such a case, unfortunately, the distance between the switching element and the capacitor is longer. This leads to not only the problem of the increase in the size of the device, but also the problem of impairment of the low-inductance characteristics.

The present invention has been achieved to solve the above problems, and an object of the present invention is to provide a power conversion device that achieves suppression of an increase in the cost and size without impairing the low-inductance characteristics.

Solution to Problem

To solve the problem and achieve the object, the present invention provides a power conversion device including a filter capacitor to accumulate therein DC power, and a semiconductor element module to perform a switching operation for converting the DC power accumulated in the filter capacitor into AC power, the filter capacitor and the switching element module being disposed in a same casing, wherein the filter capacitor is sectioned into a first capacitor and a second capacitor having a higher heat resistance than the first capacitor, the second capacitor is connected to the semiconductor element module by using a connection conductor, and is electrically connected to a busbar different from the connection conductor, and the first capacitor establishes an electrical connection with the semiconductor element module through the busbar, the connection conductor, and the second capacitor.

Advantageous Effects of Invention

The present invention provides the effect of achieving the low inductance between the switching element and the capacitor while suppressing the increase in the cost and size.

DESCRIPTION OF EMBODIMENTS

Exemplary embodiments of a power conversion device according to the present invention will be described below with reference to the accompanying drawings. The present invention is not limited to the embodiments.

First Embodiment.

Figure 1:
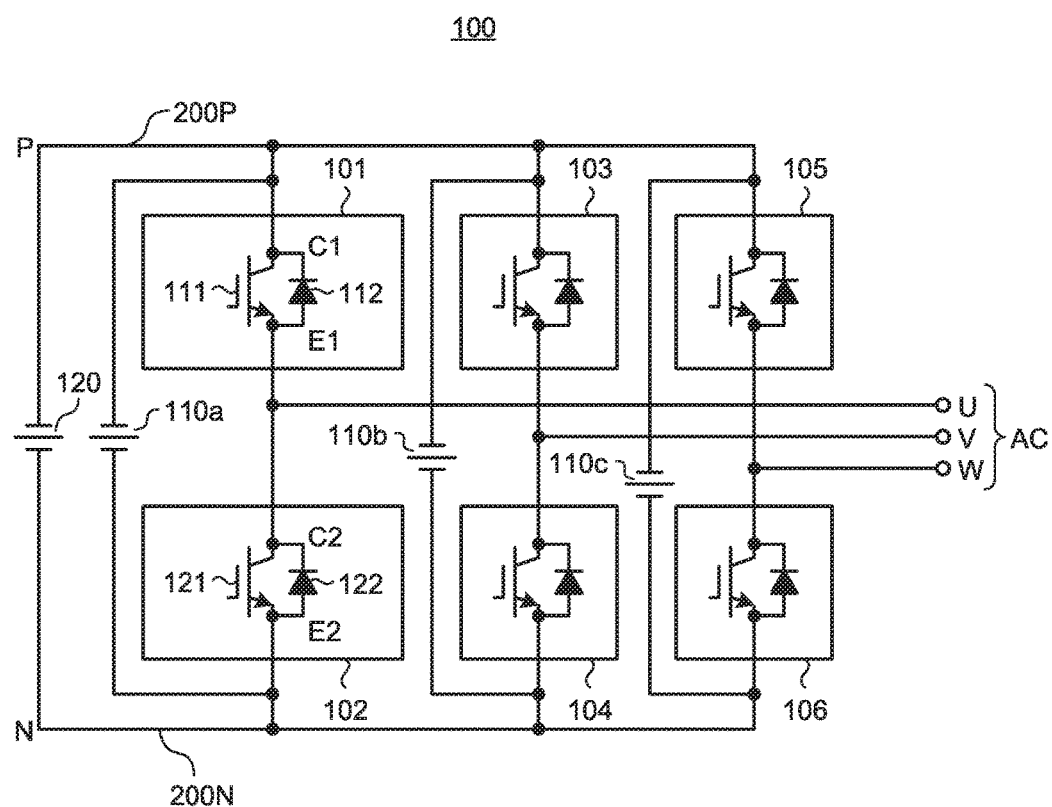
FIG. 1 is a diagram illustrating a configuration of a main circuit in a power conversion device according to a first embodiment.

FIG. 1 is a diagram illustrating a configuration of a main circuit in a power conversion device according to a first embodiment. As illustrated in FIG. 1, a main circuit 100 is configured to include semiconductor element modules 101 to 106. Switching elements mounted on the semiconductor element modules 101 to 106 are SiC elements, for example. SiC is an example of a semiconductor referred to as "wide bandgap semiconductor" because of its wider bandgap properties than silicon (Si). The wide bandgap semiconductor includes a semiconductor formed using material other than SiC, for example, a gallium nitride-based material or diamond. Therefore, a configuration using an element made of the material that is the wide bandgap semiconductor also constitutes the substance of the present invention.

Referring back to FIG. 1, the semiconductor element module 101 constituting a positive arm, and the semiconductor element module 102 constituting a negative arm are connected in series between a positive (higher-potential) DC bus 200P and a negative (lower-potential) DC bus 200N. The connection point between the semiconductor element modules 101 and 102 is led out to form a U-phase AC terminal. In the same manner as described above, the semiconductor element module 103 constituting the positive arm, and the semiconductor element module 104 constituting the negative arm are connected in series between the DC buses 200P and 200N. The connection point between the semiconductor element modules 103 and 104 is led out to form a V-phase AC terminal. The semiconductor element module 105 constituting the positive arm, and the semiconductor element module 106 constituting the negative arm are connected in series between the DC buses 200P and 200N.

The connection point between the semiconductor element modules 105 and 106 is led out to form a W-phase AC terminal.

A filter capacitor 120 that is a first capacitor having positive-pole (P) and negative-pole (N) potentials is connected to the DC buses 200P and 200N. In addition to the filter capacitor 120, the power conversion device according to the first embodiment includes heat-resistant capacitors 110a, 110b, and 110c that are second capacitors having a relatively higher heat resistance than the filter capacitor 120. The filter capacitor 120 is electrically connected to the DC buses 200P and 200N. In contrast to this, each of the heat-resistant capacitors 110a to 110c is connected to a series circuit (hereinafter, also "arm circuit" as needed) made up of the corresponding positive-arm semiconductor element module and the corresponding negative-arm semiconductor element module. As illustrated in FIG. 1, the heat-resistant capacitors 110a to 110c are connected in parallel to the filter capacitor 120, and therefore can complement a part of the function of the filter capacitor. The semiconductor element modules 101 to 106 perform a switching operation to convert DC power accumulated in the filter capacitor 120 and the heat-resistant capacitors 110a to 110c into AC power.

The semiconductor element module 101 is configured to include an IGBT 111 that is an example of a transistor element, and a flywheel diode (hereinafter, "FWD") 112 connected in inverse parallel to the IGBT 111. A collector of the IGBT 111 is connected to a cathode of the FWD 112 to form a terminal C1. An emitter of the IGBT 111 is connected to an anode of the FWD 112 to form a terminal E1. The semiconductor element module 102 is configured to include an IGBT 121 and a FWD 122 connected in inverse parallel to the IGBT 121. A collector of the IGBT 121 is connected to a cathode of the FWD 122 to form a terminal C2. An emitter of the IGBT 121 is connected to an anode of the FWD 122 to form a terminal E2.

Figure 2:
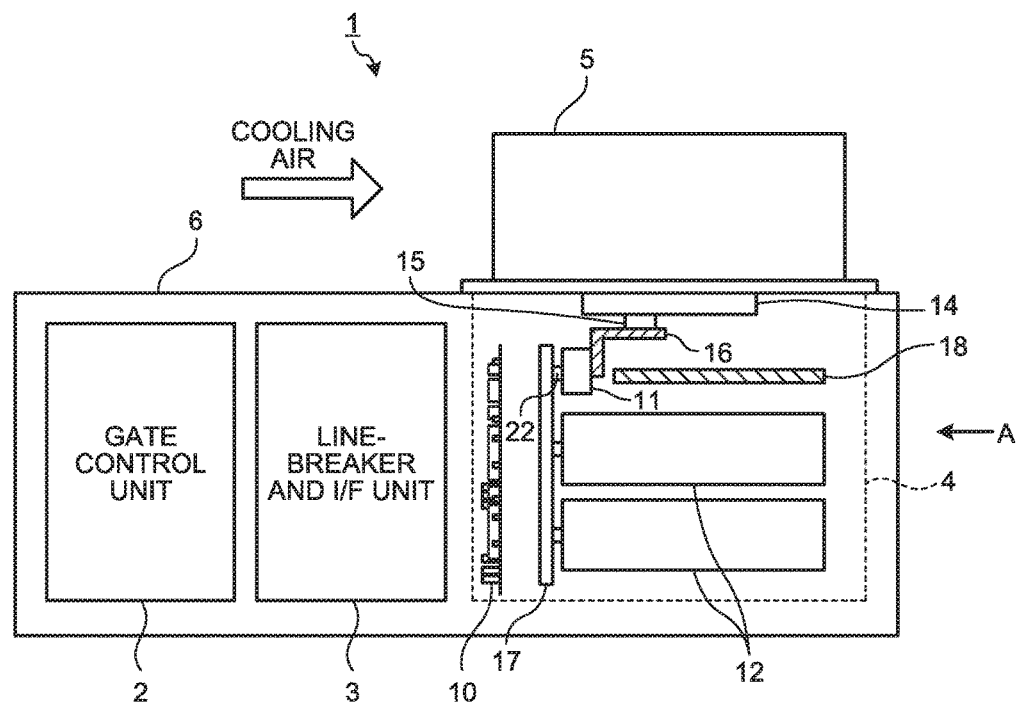
FIG. 2 is a view (top plan view) illustrating an example of a configuration of the power conversion device according to the first embodiment when the power conversion device is installed in a railway vehicle.
Figure 3:
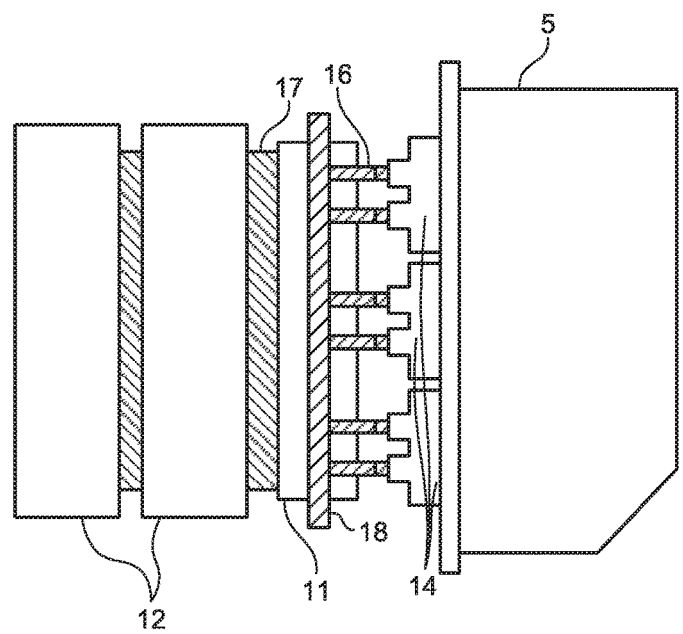
FIG. 3 is a side view of the interior of the power conversion device illustrated in FIG. 2 when the interior is viewed from the direction of an arrow A.
Figure 4:
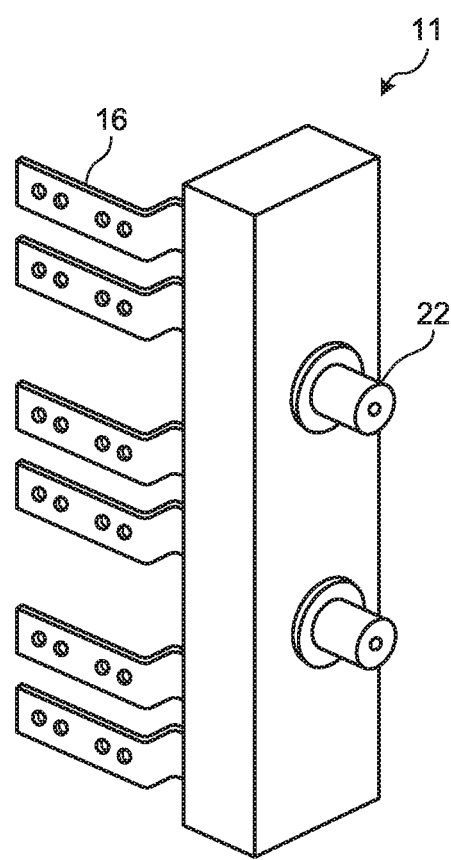
FIG. 4 is a perspective view illustrating an example of a configuration of a heat-resistant capacitor.

A configuration of the power conversion device according to the first embodiment is described next with reference to FIGS. 1 to 4. FIG. 2 is a view illustrating an example of a configuration of the power conversion device according to the first embodiment when the power conversion device is installed in a railway vehicle. FIG. 2 is a front view of the interior of a power conversion device 1 installed in the railway vehicle when the interior is viewed from the top side of the vehicle toward the rail side. FIG. 3 is a side view of the interior of the power conversion device illustrated in FIG. 2 when the interior is viewed in a direction of an arrow A. FIG. 4 is a perspective view illustrating an example of a configuration of a heat-resistant capacitor 11.

The power conversion device 1 is configured to include a gate control unit 2, a line-breaker and I/F unit 3, an inverter control unit 4, and a radiator 5. The inverter control unit 4 is configured to include a gate drive circuit 10, a heat-resistant capacitor 11, filter capacitors 12, an element unit 14, a busbar 17, and a shielding plate 18 etc. When the power conversion device 1 is actually installed in the vehicle, the gate control unit 2, the line-breaker and I/F unit 3, and the inverter control unit 4, except the radiator 5, are housed in a casing 6 to be shielded from outside air. Meantime, the radiator 5 is mounted to the outside of the casing 6 so as to be exposed to the outside air, such that the radiator 5 can be cooled by cooling air as needed.

The element unit 14 is a constituent element including a plurality of the semiconductor element modules described in FIG. 1. The gate control unit 2 is a constituent element to generate a control signal necessary to PWM-drive the semiconductor element modules in the element portion 14. The line-breaker and I/F unit 3 is a constituent element having a function of interrupting a current flowing through the main circuit 100, and a function of receiving and transmitting a signal between the gate control unit 2 and the gate drive circuit 10. The gate drive circuit 10 is a constituent element (a drive circuit) to drive the semiconductor element modules in the element portion 14 on the basis of a control signal generated by the gate control unit 2. The filter capacitors 12 are constituent elements (power supply sources) to accumulate therein DC power necessary for power conversion.

As illustrated in FIG. 4, the heat-resistant capacitor 11 has six connection conductors 16 provided on a first surface of a casing of the heat-resistant capacitor 11. The heat-resistant capacitor 11 also has two connection terminals 22 provided on a second surface of the casing (the back side) located oppositely to the first surface. The heat-resistant capacitor 11 and the element unit 14 are electrically connected by the connection conductors 16. The connection conductors 16 are conductors electrically connecting the heat-resistant capacitor 11 and DC terminals 15 of the element portion 14. FIG. 4 illustrates an example in which the connection conductor 16 is formed in a crank shape. FIG. 2 illustrates an example in which the connection conductor 16 is formed in an L-shape. As illustrated in these views, the connection conductors 16 having an electrically connecting function suffice, and can be formed in any shape (for example, in a linear shape). For example, when the connection conductors are led out from the position defined by a third surface of the heat-resistant capacitor 11 orthogonal to the second surface, the connection conductors can be formed in a linear shape.

The heat-resistant capacitor 11 is connected to the busbar 17 by the two connection terminals 22. Typical examples of the busbar 17 include a stack busbar that is configured to have a low inductance by stacking thin copper plates with insulators interposed therebetween, and a laminate busbar in which the outer surface of the stack busbar is covered with a laminate material that is a resinous film.

The filter capacitors 12 are connected to the busbar 17 without being connected to the element unit 14. That is, the electrical connection between the filter capacitors 12 and the element portion 14 is established through the busbar 17, the heat-resistant capacitor 11, and the connection conductors 16. The filter capacitors 12, which are not directly connected to the element portion 14, can be distant from the element portion 14. In contrast, the heat-resistant capacitor 11, which has the higher heat resistance than the filter capacitors 12, can be disposed close to the element portion 14.

The heat-resistant capacitor 11, which is provided in order to reduce the influence of heat on the filter capacitors 12, can have a low capacity. The heat-resistant capacitor 11 used in the first embodiment has a small size due to its capacity value lower than that the filter capacitors 12. This small size of the heat-resistance capacitor 11 leaves a space that can be occupied by no structure. In the first embodiment, the shielding plate 18 designed to cut off heat is provided in this space that can be occupied by no structure.

Next, operational effects of the power conversion device according to the first embodiment are described. It is noted that this description is based on the assumption that the semiconductor element modules of the element portion 14 are SiC elements.

For the SiC elements, the allowable temperature of the semiconductor element modules can be set to be approximately, for example, 50° C. higher than that of conventional Si elements. When the SiC elements perform the switching operation, thus, the amount of generated heat is considerably greater than that of the Si elements. Most of the heat generated by the switching operation is transferred toward the radiator 5 and then is released from a cooling fin while part of the heat is transferred toward the capacitors.

In the first embodiment, meanwhile, the heat-resistant capacitor 11 having a relatively-high heat resistance is disposed closer to the elements than the filter capacitors 12 is. This enables reducing the influence of heat on the filter capacitors 12. In the first embodiment, particularly, the shielding plate 18 is provided so as to fill the space that can be occupied by no structure. Since this shielding plate 18 cuts off a flow of heat due to convection and radiation, the heat-resistant capacitor 11 is not required to have a larger size than necessary, which is effective in suppressing the cost increase.

Other than convection and radiation, the flow of heat is due to heat conduction. It is necessary for the filter capacitors 12 to establish an electrical connection with a DC portion of the element unit 14, and heat transfer occurs due to the heat conduction through the connection conductors through which the electrical connection is established. To address the heat conduction providing a greater heat-transfer amount than the convection and the radiation, in the first embodiment, the element unit 14 that is a heat generation source is configured to be connected not to the filter capacitors 12 that constitute most of the filter capacity, but to the heat-resistant capacitor 11. This eliminates the need to increase the heat resistance of the filter capacitors 12 to a high degree. Even when the SiC elements are used, thus, it is possible to suppress the cost increase in the filter capacitors 12.

As described above, in the power conversion device according to the first embodiment, the capacitor to be configured as the filter capacitor is sectioned into the first capacitor and the second capacitor having the higher heat resistance than the first capacitor. The second capacitor is connected to the semiconductor element module by using the connection conductor, and is also electrically connected to the busbar different from the connection conductor, such that the electrical connection between the first capacitor and the semiconductor element module is established through the busbar, the connection conductor, and the second capacitor. This achieves the effect of providing the low inductance between the switching element and the capacitor while suppressing the increase in the cost and size.

Further, in the power conversion device according to the first embodiment, the heat-resistant capacitor 11 is formed to have the smaller size than the filter capacitors 12. The shielding plate is provided in a space resulting from the difference in size between the heat-resistant capacitor 11 and one filter capacitor 12. This enables effectively cutting off the flow of heat due to the convection and radiation.

Second Embodiment.

Figure 5:
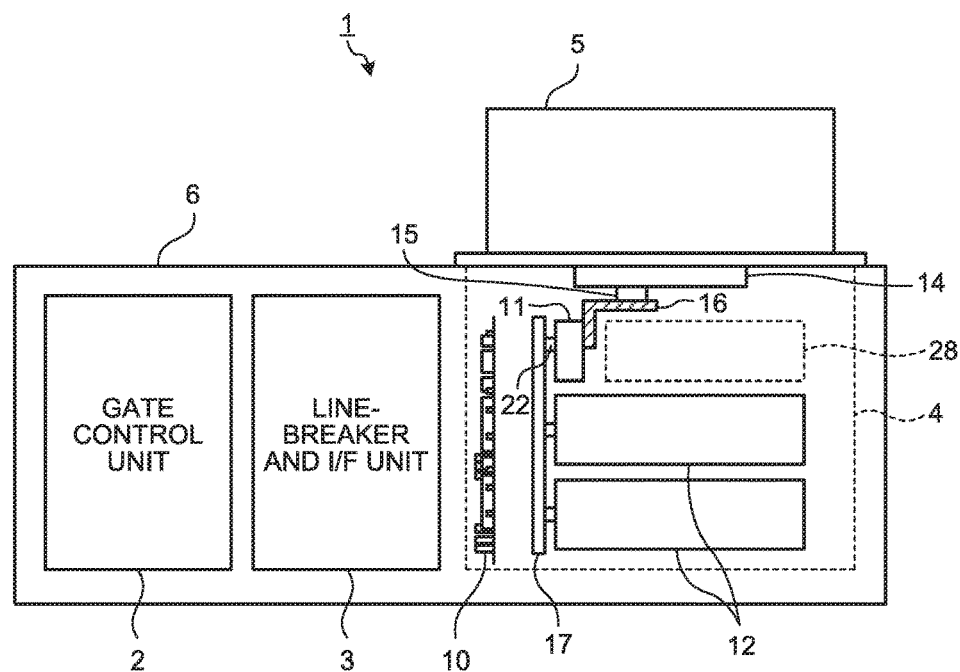
FIG. 5 is a view (top plan view) illustrating an example of a configuration of a power conversion device according to a second embodiment, the configuration being different from that in FIG. 2.

FIG. 5 is a view (top plan view) illustrating an example of a configuration of a power conversion device according to a second embodiment, the configuration being different from that in FIG. 2. The configuration illustrated in FIG. 5 is the configuration illustrated in FIG. 2 with the shielding plate 18 removed and the resulting empty space formed as a separation space 28 for reducing the influence of heat convection. The other constituent parts of the power conversion device of the second embodiment are the same as or equivalent to those of the configuration of the first embodiment illustrated in FIG. 2. These common constituent parts are denoted by like reference signs, and the redundant descriptions thereof will be omitted.

When the heat generated in the element portion 14 is transferred due to the convection, the heated air moves in the opposite direction to the gravity. That is, in FIG. 5, the heat is transferred in the direction from the back side of the sheet plane toward the front side thereof. Therefore, thermal design to form the separation space 28 for reducing the influence of heat without providing the shielding plate as described in the first embodiment enables the use of a conventional filter capacitor not having a high heat resistance. This achieves the effect of suppressing the cost increase.

As described above, in the power conversion device according to the second embodiment, the heat-resistant capacitor is formed to have the size smaller than the filter capacitors. The space resulting from the difference in size between the heat-resistant capacitor and one filter capacitor is configured to serve as a separation space for reducing the influence of heat convection. Since this eliminates the need for the shielding plate as described in the first embodiment, the number of components is reduced to achieve the suppression of the cost increase.

Third Embodiment.

Figure 6:
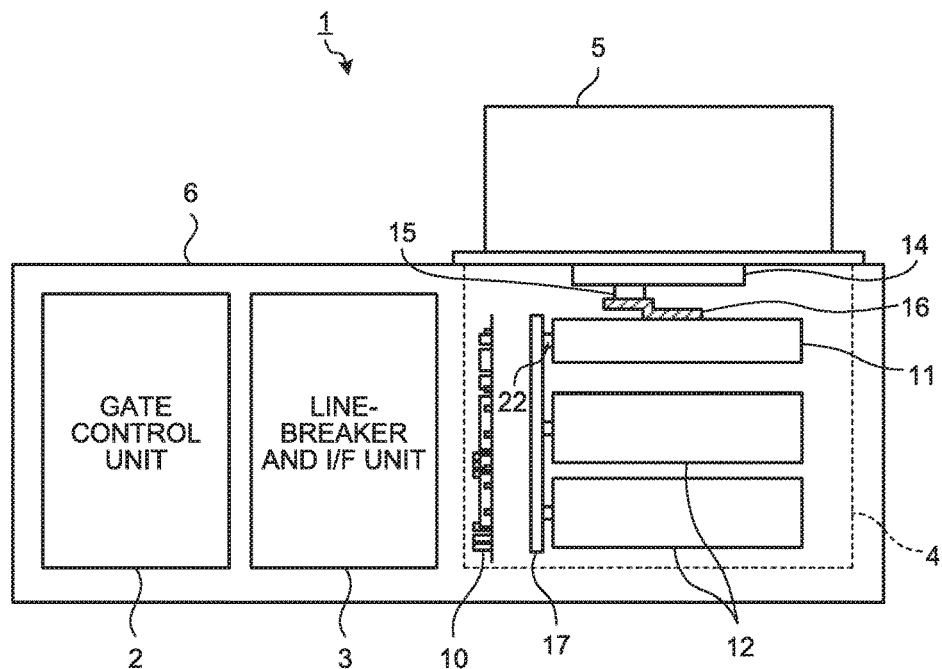
FIG. 6 is a diagram (top view) illustrating an example of a configuration of a power conversion device according to a third embodiment, the configuration being different from those in FIGS. 2 and 5.

FIG. 6 is a view (top plan view) illustrating an example of a configuration of a power conversion device according to a third embodiment, the configuration being different from those in FIGS. 2 and 5. The configuration of the power conversion device illustrated in FIG. 6 is the configuration illustrated in FIG. 5 with the casing of the heat-resistant capacitor 11 filling the separation space 28 for reducing the influence of heat convection. The casing of the heat-resistant capacitor 11 can be construed to function as a shielding plate (a shield), as compared to the configuration in FIG. 2.

In the power conversion device according to the third embodiment, although the size of the heat-resistant capacitor 11 is increased, the capacity value of the filter capacitors 12 can be decreased because the capacity value (capacitance) of the heat-resistant capacitor 11 is increased. This achieves the effect of downsizing the filter capacitors 12, as compared to the first and second embodiments, to make the power conversion device compact.

The configurations described in the first to third embodiments are merely examples of the configuration of the present invention. It goes without saying that these configurations can be combined with other known techniques, or modifications thereof such as omission of a part thereof can be made without departing from the scope of the present invention.

In the first to third embodiments, the switching elements mounted on the semiconductor element modules 101 to 106 have been described as switching elements formed of the wide bandgap semiconductors as typified by the SiC elements. However, any switching element capable of high-speed switching may cause the problems as described above. Therefore, a configuration using switching elements formed of a narrow bandgap semiconductor as typified by a Si element also constitutes the scope of the present invention.

INDUSTRIAL APPLICABILITY

As described above, the present invention is useful as a power conversion device that does not impair the low inductance while suppressing an increase in the cost and size.

REFERENCE SIGNS LIST

1 power conversion device
2 gate control unit 3 line-breaker and I/F unit
4 inverter control unit
5 radiator
6 casing
10 gate drive circuit
11, 110a to 110c heat-resistant capacitor (second capacitor)
12, 120 filter capacitor (first capacitor)
14 element unit
15 DC terminal
16 connection conductor
17 busbar
18 shielding plate
22 connection terminal
28 separation space
100 main circuit
101 to 106 semiconductor element module
200P, 200N DC bus

The invention claimed is:

1. A power conversion device including a filter capacitor to accumulate therein DC power, and a semiconductor element module to perform a switching operation for converting the DC power accumulated in the filter capacitor into AC power, the filter capacitor and the semiconductor element module being disposed in a same casing, wherein
the filter capacitor is sectioned into a first capacitor and a second capacitor having a higher heat resistance than the first capacitor,
the second capacitor is electrically connected to the semiconductor element module via a connection conductor, the second capacitor is electrically connected to a busbar, and the busbar is different and separate from the connection conductor,
the first capacitor is connected to the busbar to thereby establish an electrical connection with the semiconductor element module through the second capacitor and the connection conductor, and
the second capacitor is formed to have a size smaller than that of the first capacitor, and a shielding plate is provided in a space on a side opposite to the side of the second capacitor connected to the busbar, the space resulting from a difference in size between the first and second capacitors.

2. The power conversion device according to claim 1, wherein the first and second capacitors have end portions disposed in alignment on respective sides thereof connected to the busbar.

3. The power conversion device according to claim 1, wherein the second capacitor is disposed to shield the first capacitor when the second capacitor is viewed from the semiconductor element module.

4. The power conversion device according to claim 1, wherein the connection conductor has an L-shape, a crank shape, or a liner shape.

5. The power conversion device according to claim 1, wherein a switching element mounted on the semiconductor element module is formed of a wide bandgap semiconductor.

6. The power conversion device according to claim 5, wherein the wide bandgap semiconductor is a semiconductor using a silicon carbide, a gallium nitride-based material, or diamond.

7. The power conversion device according to claim 1, wherein the second capacitor is located closer to the semiconductor element module than the first capacitor.

8. A power conversion device including a filter capacitor to accumulate therein DC power, and a semiconductor element module to perform a switching operation for converting the DC power accumulated in the filter capacitor into AC power, the filter capacitor and the semiconductor element module being disposed in a same casing, wherein
the filter capacitor is sectioned into a first capacitor and a second capacitor having a higher heat resistance than the first capacitor,
the second capacitor is electrically connected to the semiconductor element module via a connection conductor, the second capacitor is electrically connected to a busbar, and the busbar is different and separate from the connection conductor,
the first capacitor is connected to the busbar to thereby establish an electrical connection with the semiconductor element module through the second capacitor and the connection conductor,
the second capacitor is formed to have a size smaller than that of the first capacitor, and
a space on a side opposite to the side of the second capacitor connected to the busbar results from a difference in size between the first and second capacitors, the space being a separation space for reducing an influence of heat convection transmitted from the semiconductor element module.

9. The power conversion device according to claim 8, wherein the first and second capacitors have end portions disposed in alignment on respective sides thereof connected to the busbar.

10. The power conversion device according to claim 8, wherein
a first terminal for connection to the connection conductor is provided on a first surface of a casing of the second capacitor, and
a second terminal for connection to the busbar is provided on a second surface of the casing of the second capacitor, the second surface being different from the first surface of the casing of the second capacitor.

11. The power conversion device according to claim 8, wherein the second capacitor is located closer to the semiconductor element module than the first capacitor.

* * * * *